United States Patent [19]
LeFrançois et al.

[11] Patent Number: 5,842,251
[45] Date of Patent: Dec. 1, 1998

[54] AUTOMOBILE WIPER HAVING AN IMPROVED WASHING LIQUID SPRAY DEVICE

[75] Inventors: Laurent LeFrançois, Issoire; Jean-Louis Roumegoux, Paris, both of France

[73] Assignee: Valeo Systems d'Essuyage, La Verriere, France

[21] Appl. No.: 977,721

[22] Filed: Nov. 25, 1997

[30] Foreign Application Priority Data

Nov. 29, 1996 [FR] France .................................. 96 14650

[51] Int. Cl.⁶ .................. B60S 1/46; B60S 1/52; B60S 1/32
[52] U.S. Cl. .................. 15/250.04; 239/272; 15/250.351
[58] Field of Search ............... 15/250.04, 250.02, 15/250.03, 250.01, 250.351; 239/547, 284.1, 272

[56] References Cited

U.S. PATENT DOCUMENTS

| | | | |
|---|---|---|---|
| 3,606,157 | 9/1971 | Chapin | 239/547 |
| 3,891,150 | 6/1975 | Hoff et al. | 239/272 |
| 3,940,068 | 2/1976 | Mohnach et al. | 15/250.04 |

FOREIGN PATENT DOCUMENTS

| | | | |
|---|---|---|---|
| 566470 | 10/1993 | European Pat. Off. | 15/250.04 |
| 2337774 | 3/1974 | Germany | 15/250.04 |

*Primary Examiner*—Gary K. Graham
*Attorney, Agent, or Firm*—Morgan & Finnegan, L.L.P.

[57] ABSTRACT

An automobile wiper has a washing liquid spray device carried by the wiper. The spray device includes a tubular supply pipe [(16)] and at least one member [(46)] for spraying liquid in the direction of a pane of glass to be wiped. At least one clamp [(18)] for attaching the pipe [(16)] to the wiper, has a hollow needle [(42)] which pierces the pipe [(16)] and which supplies the washing liquid spraying member [(46)].

18 Claims, 5 Drawing Sheets

AUTOMOBILE WIPER HAVING AN IMPROVED WASHING LIQUID SPRAY DEVICE

FIELD OF THE INVENTION

The invention concerns an automobile wiper having improved system for attaching a washing liquid supply pipe, thereby preventing.

BACKGROUND OF THE INVENTION

It is particularly advantageous to dispose a washing liquid spray device directly on the wiper rather than on a bodywork panel close to the pane of glass to be wiped.

The jet of liquid from being diverted by the air currents which flow along the pane of glass when the vehicle is travelling at high speed.

In addition, the spray device carried by the wiper sweeps the surface of the pane of glass at the same time as the wiper, which makes it possible to obtain a more homogenous distribution of liquid on the pane of glass.

However, the spray devices carried by the wiper must be supplied with washing liquid under pressure by a supply pipe which extends along the wiper and which is connected to a supply device inside the vehicle. It is therefore, necessary to attach the pipe along the arm of the wiper, and optionally on the blade; and various fixing devices are used to attach the pipe, such as clamps which at least partially surround the pipe and arm.

In addition, in some cases, the washing liquid spray devices, which are arranged on the wiper blade, cover only part of the surface to be cleaned, because they are very close to the pane of glass, thereby reducing the surface effectively reached by the jet of liquid.

Thus, it is sometimes necessary to provide several spray devices, either in the form of a large sprinkling manifold, or in the form of several nozzles distributed along the wiper.

In every case, fixing these spray devices is a significant problem.

SUMMARY OF THE INVENTION

The invention proposes an automobile wiper in which a washing liquid spray device, which includes a tubular supply pipe and at least one device for spraying liquid in the direction of a pane of glass to be wiped, is carried by the wiper, and in which there is provided at least one clamp for attaching the pipe to the wiper, wherein the clamp includes a hollow needle which pierces the wall of the pipe and which supplies the washing liquid spray device.

In accordance with other aspects of the invention, the needle opens out at one end inside the pipe and at the other end in a distribution cavity which is formed in the attachment clamp and which is provided with at least one spray orifice;

wherein the orifices are turned in the direction of a pane of glass to be wiped in order to form a washing liquid spray device.

an open free end of the pipe is engaged in a housing in the clamp, and the needle is carried by a flap which is folded up to enable the needle to pierce the pipe;

wherein the housing in the clamp has at least one washing liquid spray orifice.

The needle is produced in one piece with the clamp;

wherein the needle is produced in the form of an independent part around which the clamp is moulded on by plastic moulding.

The needle is produced in the form of an attached piece which is inserted in the clamp after attachment of the pipe to the wiper by the clamp.

The clamp is mounted by elastic nesting on a wiper arm.

The clamp has an articulated fixing lug which surrounds a wiper arm and which has elastic nesting on a main body of the clamp;

The clamp is produced in the form of two independent parts which have elastic nesting for their assembly, and the two parts in the assembled position surround an arm of the wiper and the pipe.

The clamp has a U-shaped bracket which is open in the direction of the pane of glass and which is designed to straddle a wiper blade in order to guide it.

BRIEF DESCRIPTION OF THE DRAWINGS

Other characteristics and advantages of the invention will emerge from a reading of the detailed description which follows, for an understanding of which reference will be made to the accompanying drawings in which.

DESCRIPTION OF THE PREFERRED EMBODIMENT

Figure 1:
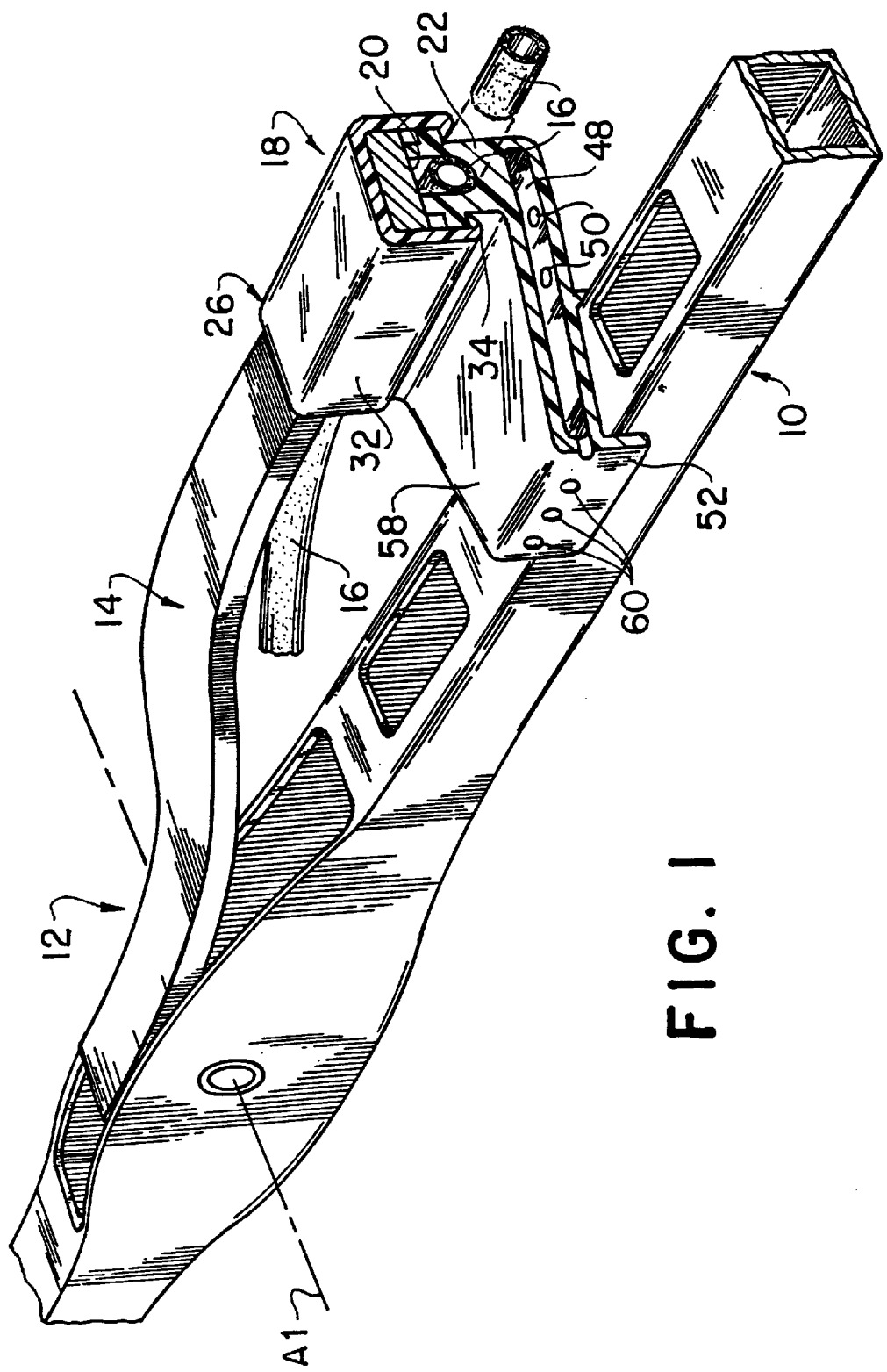
FIG. 1 is a partial perspective view with cutaway of an automobile wiper having a clamp for attaching a washing liquid supply pipe in accordance with the teachings of the invention.

FIG. 1 depicts a part of an automobile wiper. In such a wiper, a wiper blade 10 is mounted so as to pivot about a transverse spindle A1 at the free end 12 of a wiper arm 14.

In this embodiment, the wiper 10 carries a washing liquid spray device which is supplied by a supply pipe 16 which extends along the arm 14 to be connected to a device for supplying washing liquid under pressure (not shown) arranged generally inside the vehicle. The pipe 16 is fixed along the arm 14 by means of a clamp 18 in accordance with the teachings of the invention.

Figure 2:
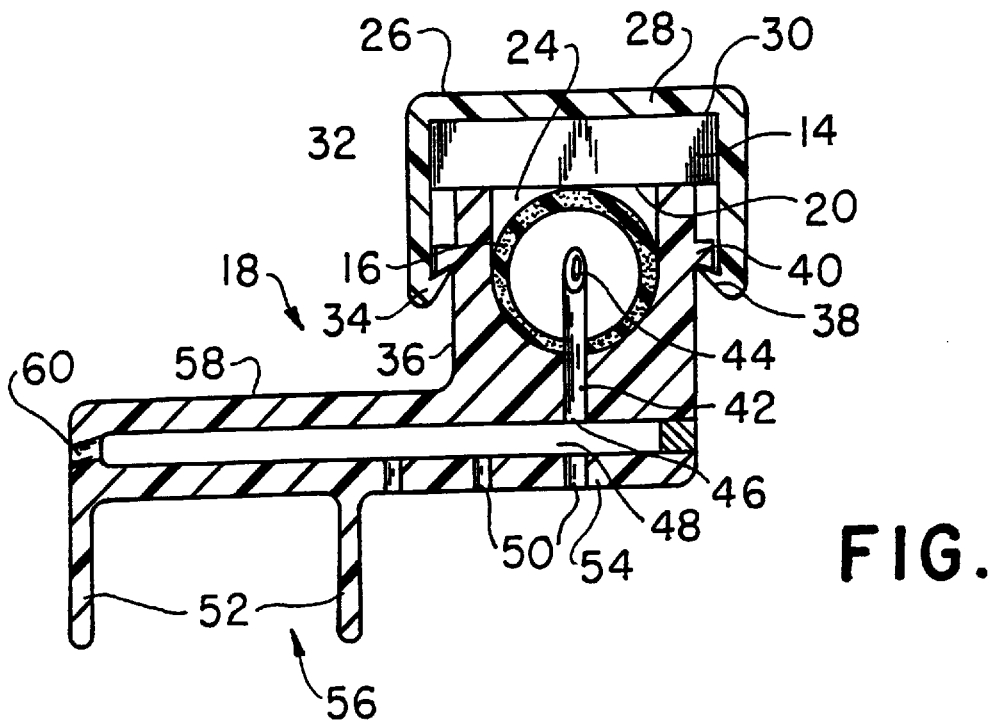
FIG. 2 is a view in transverse section of the clamp, arm and pipe of FIG. 1.

In the embodiments of the invention depicted in FIGS. 1 and 2, the arm 14 is a metal rod of rectangular cross section and the pipe 16 extends along a bottom face 20 of the arm 14.

The clamp 18 has a lower body 22 which is provided with a housing 24 which extends longitudinally over the length of the clamp 18 and whose dimensions in transverse section are substantially equal to those of the pipe 16. The housing 24 opens upwards so that, when the pipe 16 is received inside the housing 24 and the lower body 22 of the clamp 18 is pressed against the bottom face 20 of the arm 14, the pipe 16 is captive inside the housing 24.

For fixing the clamp 18, an upper clamp body 26 is provided, which has essentially a top transverse plate 28 bearing against a top face 30 of the arm 14, and two longitudinal side wings 32 which extend vertically downwards, below the bottom surface 20 of the arm 14, so that their free bottom edge 34 is arranged opposite two opposite longitudinal side faces 36, respectively of the lower body 22 of the clamp 18.

The bottom edges 34 of the wings 32 each have a nose 38 which extends transversely inwards and which is designed to cooperate with a downward-turned rim 40 arranged on the side faces 36 of the lower body 22 to allow the locking of the upper 26 and lower 22 bodies of the clamp 18 when the clamp is mounted on the arm 14.

In accordance with the teachings of the invention, the clamp 18 has a hollow needle 42 which is designed to pierce the wall of the pipe 16. The needle 42 is produced, for example, from metal and the lower body 22 of the clamp 18 is moulded on around the needle 42 by plastic moulding so that the needle 42 extends substantially vertically with respect to the lower body 22 of the clamp.

The top end 44 of the hollow needle 42, which is tapered, extends inside the housing 24 provided for receiving the pipe 16, whilst the bottom end 46 of the needle 42 opens out into an internal cavity 48 formed in the lower body 22 of the clamp 18. The cavity 48 is provided with a series of spray orifices 50, which are turned in the direction of the pane of glass.

When the pipe 16 is attached to the arm 14 by the clamp 18, the tapered top end 44 of the needle 42 pierces the pipe 16 either at the moment when the pipe is introduced into the housing 24 in the lower body 22, or when the lower 22 and upper 26 bodies of the clamp 18 are assembled, which has the effect of compressing the pipe 16 between the lower face 20 of the arm 14 and the upper end 44 of the needle 42, in a direction parallel to the orientation of the needle 42.

Thus, the top end 44 of the needle is able to take, from the pipe 16, pressurised washing liquid supplied by the supply device. Liquid is then transferred to the internal cavity 48 and distributed through orifices 50 in the direction of the pane of glass to be wiped.

In the embodiment depicted in FIGS. 1 and 2, the lower body 22 of the clamp 18 also has two parallel longitudinal flanges 52 which extend vertically downwards from a bottom face 54 on the lower body 22 to form a bracket 56 which opens downwards in the direction of the pane of glass.

As can be seen more particularly in FIG. 1, the bracket 56 is designed to straddle the wiper blade 10 in order to guide it in the transverse direction.

In the embodiment which is depicted in the FIGS. 1 and 2 the section of the arm 14 to which the clamp 18 is fixed is offset transversely with respect to a longitudinal plane of the blade 10 so that the bracket 56 is formed at one end of a transverse protrusion 58 on the lower body 22 of the clamp 18. Advantageously, the internal cavity 48 of the lower body 22 extends inside the protrusion 58, and complementary spray orifices 60 are provided, arranged in a side face of the protrusion 58 so that the washing liquid is able to be distributed on both sides of the wiper blade 10.

Figure 3:
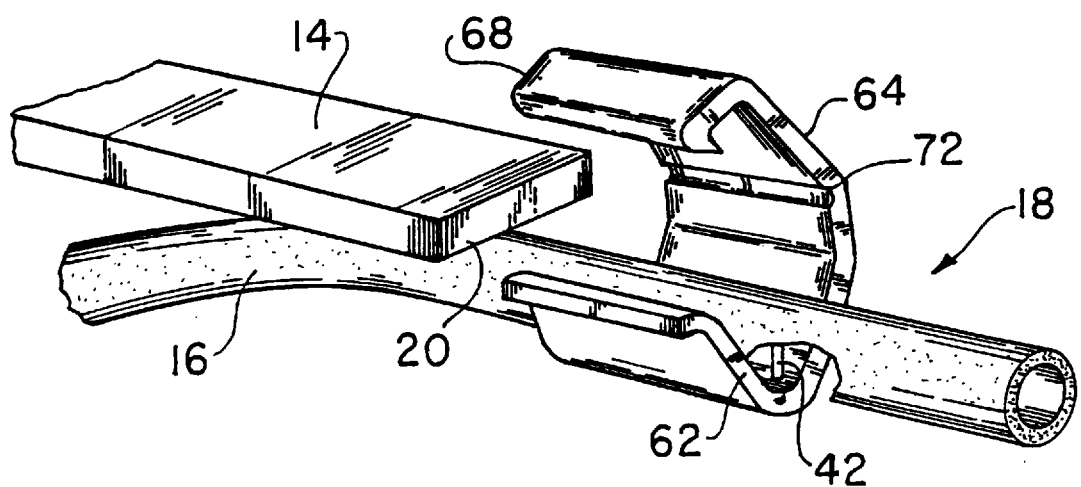
FIG. 3 is a perspective view illustrating the mounting of a second embodiment of a clamp according to the invention.
Figure 4:
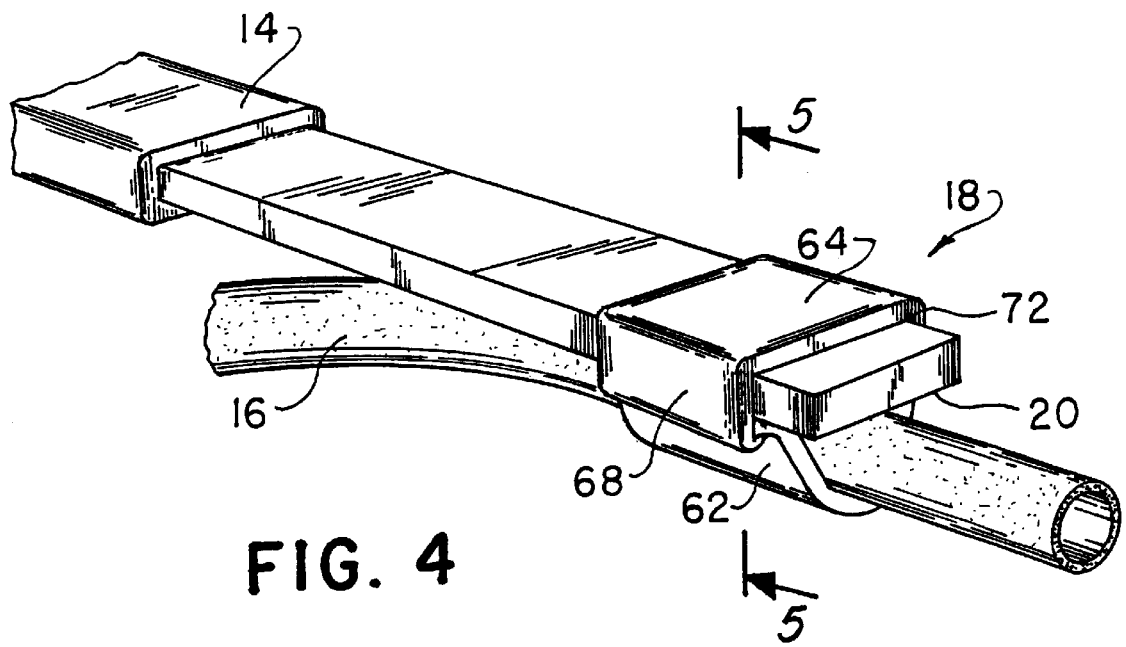
FIGS. 4 and 5 are views of the clamp of FIG. 2 in the mounted position, in perspective and in section through a transverse plane, respectively.
Figure 5:
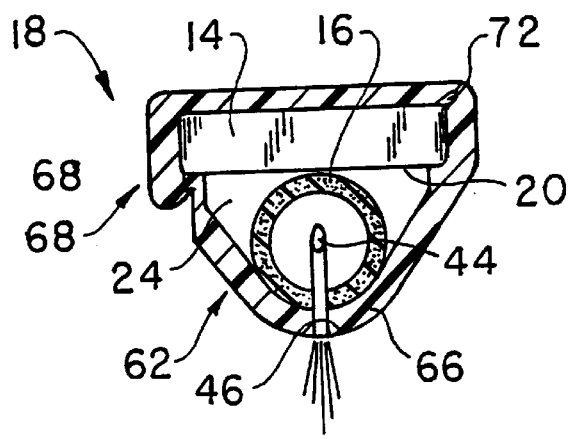

FIGS. 3 to 5 depict a second embodiment of the invention, in which the clamp 18 has a main body 62 which, when it is pressed against the bottom surface 20 of the arm 14, delimits a housing 24 which is substantially in a V shape open upwards, in which the pipe 16 is held when the clamp 18 is fixed on the arm 14.

The main body 62 thus has two longitudinal plates which are connected by their bottom edge and whose top edge is designed to come into abutment against the bottom surface 20 of the arm 14.

The main body 62 is moulded around a hollow needle 42 so that the needle 42 extends substantially vertically from the bottom of the housing 24 in a V which is formed by the connected bottom edges of the two plates of the main body 62. The tapered top end 44 of the needle 42 is arranged substantially at the centre of the housing 24, whilst the bottom end 46 of the needle 42 opens out directly towards the outside in an external face 66 of the main body 62. Thus the liquid taken from the pipe 16 by the needle 42 is sprayed directly in the direction of the pane of glass.

For fixing it to the arm 14, the clamp 18 has a fixing lug 64 which is articulated about a longitudinal axis on a top edge of one of the plates of the main body 62 to be able to fold the fixing lug 64 against the top face of the arm 14 and so that a free end 68 of the lug 64 can cooperate with the top edge of the other plate of the main body 62.

In this embodiment, the lug 64 is produced in one piece with the main body 62 and their articulation about a longitudinal axis is produced in a strip of thinner material 72.

Figure 6:
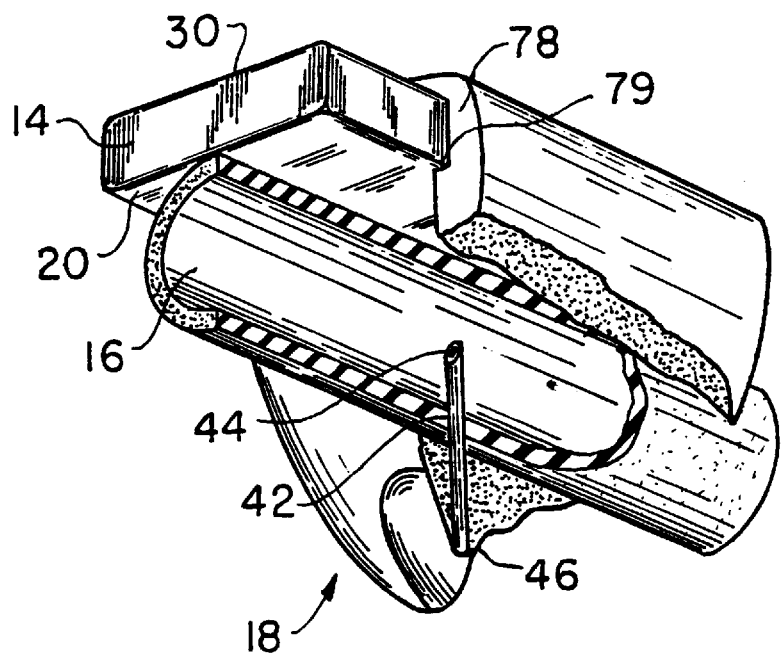
FIGS. 6 and 7 illustrate a third embodiment of the invention, in perspective with cutaway and in section through a transverse plane, respectively.
Figure 7:
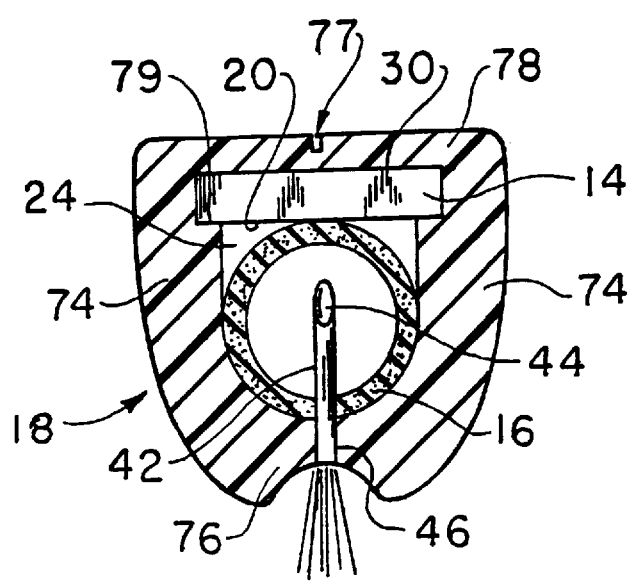

FIGS. 6 and 7 depict a third embodiment of the invention, in which the clamp 18 is produced in a single piece which has two side walls 74 which delimit a housing 24 substantially in the form of a U open towards the top to receive the pipe 16, and which are connected at their bottom end by a strip of material 76 whose thickness makes it possible, in the manner of a hinge, for the two walls 74 to be moved away from each other.

In fact, each of the walls 74 is provided at its top end with a transverse flange 78 which is designed to bear against a top face 30 of the arm 14 whilst the walls 74 are also in abutment, through a transverse rebate 79, against the bottom face of the arm 14.

As can be seen more particularly in FIG. 7, the two transverse flanges 78 of the two walls 74 join and cooperate through elastic nesting 77 to prevent any undesirable separation of the two walls 74.

As in the previous embodiment, the clamp 18 is moulded around a substantially vertical hollow needle 42 whose tapered top end 44 is arranged substantially at the centre of the housing 24 to pierce the pipe 16, and whose bottom end 46 opens out directly towards the outside in an external face of the clamp, in the direction of the pane of glass.

Figure 8:
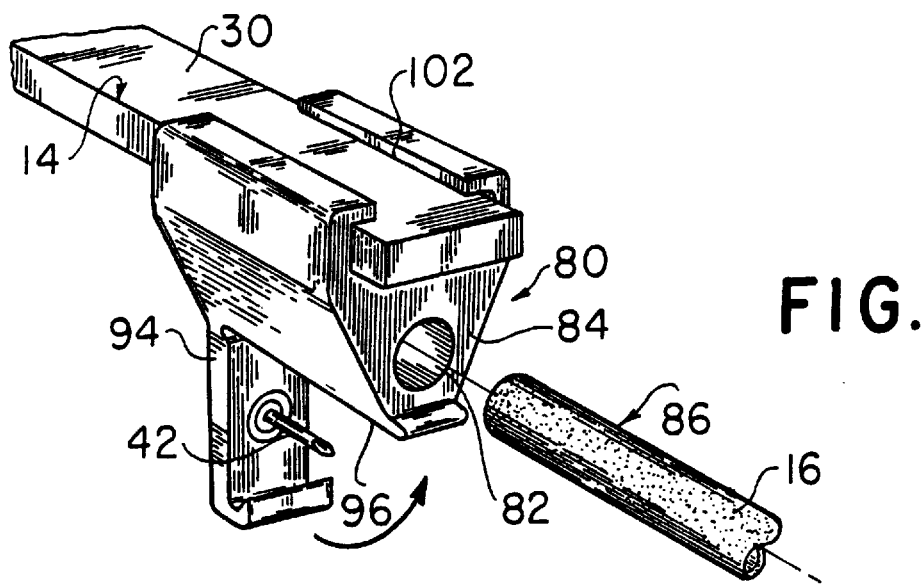
FIG. 8 is a perspective view illustrating the mounting of a fourth embodiment of the invention.
Figure 9:
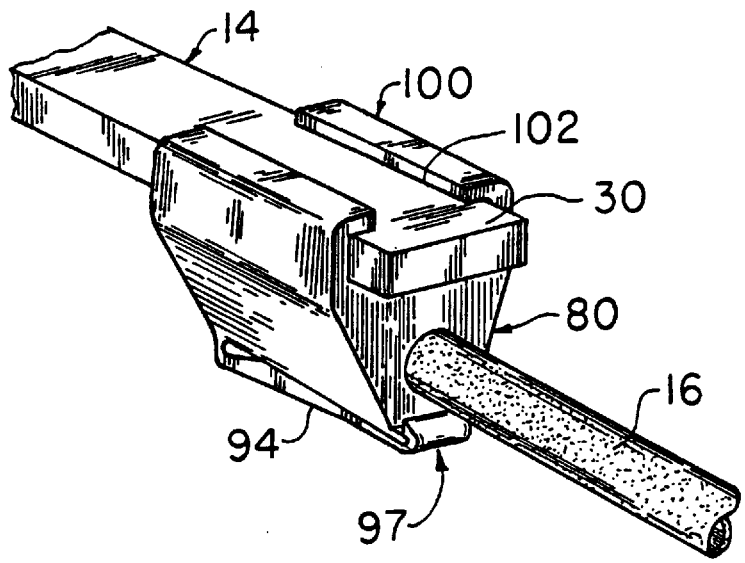
FIGS. 9 and 10 illustrate the clamp in FIG. 8 in the mounted position, in perspective and in section through a longitudinal plane, respectively of the wiper.
Figure 10:
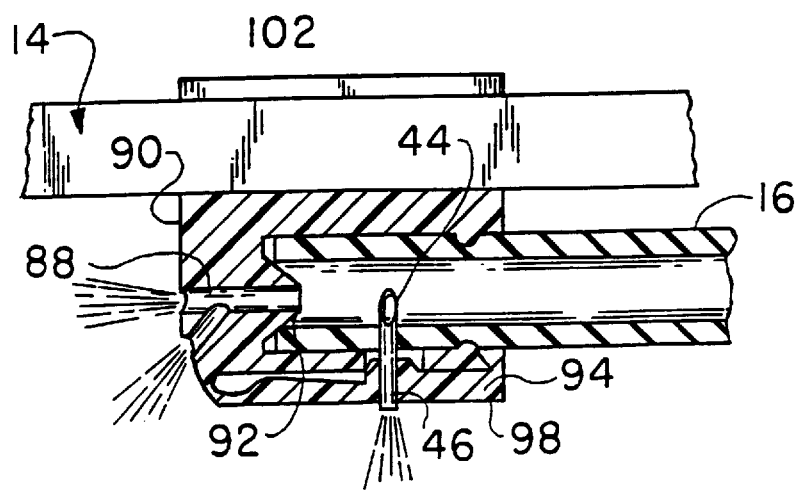

FIGS. 8 to 10 depict a fourth embodiment of the invention.

The clamp 18 which Is depicted in these figures has a main body 80, whose shape in transverse section is substantially that of a trapezium whose large base is in abutment against the bottom face of the arm 14.

The main body 80 is provided with a cylindrical housing 82 of longitudinal axis substantially parallel to the arm 14. The cylindrical housing 82 opens out in a rear transverse face 84 of the main body 80, on the opposite side to the free end 12 on the arm 14 to which the blade 10 is attached.

As can be seen more particularly in FIG. 10, the cylindrical housing 82 is designed to receive a free end 86 of the pipe 16. In fact, the housing 82 does not open out towards the front, only one spray orifice 88 is formed in the main body 80 to open out axially, on the one hand in the cylindrical housing 82 and on the other hand in a front transverse face 90 of the main body 80. Thus, when the free end 86 of the pipe 16 is engaged at the bottom of the cylindrical housing 82, washing liquid is able to be sprayed in the direction of the pane of glass through the orifice 88.

As can be seen in FIG. 10, a transverse base wall of the housing 82 has an axial conical protuberance 92 which makes it possible to achieve centering and a seal between the end 86 of the pipe 16 and the housing 82. The spray orifice 88, which is arranged axially in the cone-shaped protuberance 92, opens out directly inside the end 86 of the pipe 16 when the pipe is fitted at the base of the housing 82.

In addition, the clamp 18 has a flap 94 which is articulated about a substantially horizontal transverse axis, in front of a lower wall 96 of the main body 80. The flap 94 is designed to be folded into the horizontal position against the lower wall 96, and has an element 97 for locking in this position.

The flap 94 carries a hollow needle 42 which, when the flap 94 is in the folded-up position depicted in FIGS. 9 and 10, is arranged vertically so that its top end 44 is received inside the pipe 16 after having pierced the wall thereof and so that its bottom end 46 opens out below a bottom face 98 of the flap 94 in order to spray washing liquid in the direction of the pane of glass. The needle 42 is then received through an orifice formed in the bottom wall 96 of the body 80 as to open out towards the inside in the cylindrical housing 82.

Thus, the bottom end 46 of the hollow needle 42 opens out directly in the direction of the pane of glass, forming a complementary washing liquid spray orifice and thus making it possible to bold the pipe 16 in the cylindrical housing 82 in the axial direction.

To fix it to the arm 14, the clamp 18 has two right-angled fixing lugs 100 which extend upwards on each side of the arm 14 and a transverse flange 102 of which cooperates with the top face 30 of the arm 14.

What is claimed is:

1. An automobile wiper having a washing liquid spray device, which includes a tubular supply pipe and at least one member for spraying a liquid in the direction of a pane of glass to be wiped comprising at least one clamp for attaching the pipe to the wiper, said at least one clamp having a hollow needle which pierces the wall of the pipe and which supplies the washing liquid spray member.

2. A wiper according to claim 1, wherein the needle opens out at a first end and a second end, the first end inside the pipe and the second end in a distribution cavity in said clamp, the cavity having at least one spray orifice.

3. A wiper according to claim 1, wherein the needle includes a first end and a second end, the first end opening inside the pipe and the second end opening outwardly from an external face of the clamp in the direction of a pane of glass to be wiped.

4. A wiper according to claim 1, wherein the pipe is engaged in a housing in the clamp and the needle is carried by a flap of the clamp, wherein the flap folds to enable the needle to pierce the pipe.

5. A wiper according to claim 1, wherein a free end of the pipe is engaged in a housing in the clamp.

6. A wiper according to claim 5, wherein the free end of the pipe is open and the housing has at least one washing liquid spray orifice.

7. A wiper according to claim 1, wherein the needle is produced in one piece with the clamp.

8. A wiper according to claim 1, wherein the needle includes an independent part around which the clamp is moulded.

9. A wiper according to claim 1, wherein the needle includes an attached piece which is inserted in the clamp after attachment of the pipe to the wiper by the clamp.

10. A wiper according to claim 1, wherein the clamp is mounted by elastic nesting on a wiper arm.

11. A wiper according to claim 1, wherein the clamp has an articulated fixing lug surrounding a wiper arm and elastic nesting on a main body of the clamp.

12. A wiper according to claim 1, wherein the clamp includes two independent parts the cooperate through elastic nesting and the two parts in a cooperating position surround an arm of the wiper and the pipe.

13. A wiper according to claim 1, wherein the clamp has a U-shaped bracket in the direction of the pane of glass and straddling a wiper blade to guide the blade.

14. An automobile wiper having a liquid spray device, which includes a tubular supply pipe and at least one clamp for attaching the pipe to the wiper, said at least one clamp having a housing for engaging the pipe and a hollow needle, wherein one end of the needle opens out into a wall of the pipe and another end of the needle opens out into a distribution end of the clamp, the distribution end having at least one spray orifice for spraying liquid in the direction of a pane of glass.

15. A wiper according to claim 14, wherein the clamp has a bracket opening in the direction of the pane of glass and straddling a wiper blade to guide the blade.

16. A wiper according to claim 15, wherein the bracket is at one end of a protrusion of the clamp and wherein the distribution end extends inside the protrusion to distribute liquid on both sides of the blade.

17. A wiper according to claim 14, wherein the clamp is formed of two parts cooperating by elastic nesting, the two parts surrounding an arm of the wiper and the pipe.

18. A wiper according to claim 17, wherein the clamp is moulded around the needle.

* * * * *